(12) United States Patent
Wang et al.

(10) Patent No.: US 10,107,955 B2
(45) Date of Patent: Oct. 23, 2018

(54) DISPLAY BACKLIGHT MODULE HAVING DOUBLE-SIDE ADHESIVE BLOCKS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xuerong Wang, Beijing (CN); Caizheng Zhang, Beijing (CN); Hai Kang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 233 days.

(21) Appl. No.: 14/914,318

(22) PCT Filed: Sep. 17, 2015

(86) PCT No.: PCT/CN2015/089856
§ 371 (c)(1),
(2) Date: Feb. 25, 2016

(87) PCT Pub. No.: WO2016/173183
PCT Pub. Date: Nov. 3, 2016

(65) Prior Publication Data
US 2016/0313487 A1 Oct. 27, 2016

(30) Foreign Application Priority Data

Apr. 27, 2015 (CN) .......................... 2015 1 0205042

(51) Int. Cl.
*G02F 1/13357* (2006.01)
*F21V 8/00* (2006.01)

(52) U.S. Cl.
CPC .......... *G02B 6/009* (2013.01); *G02B 6/0068* (2013.01); *G02B 6/0073* (2013.01); *G02B 6/0091* (2013.01)

(58) Field of Classification Search
CPC ................ G02B 6/0086; G02B 6/0091; G02F 1/133603; G02F 1/133608; G09F 2013/049; G09F 13/18; F21V 17/101
See application file for complete search history.

(56) References Cited

U.S. PATENT DOCUMENTS

| | | | | |
|---|---|---|---|---|
| 5,786,665 A | * | 7/1998 | Ohtsuki | G02B 6/0021 313/113 |
| 7,270,464 B2 | * | 9/2007 | Nakayoshi | G02B 6/0021 362/612 |

(Continued)

FOREIGN PATENT DOCUMENTS

| CN | 2005259374 A | 9/2005 |
|---|---|---|
| CN | 101655636 A | 2/2010 |

(Continued)

OTHER PUBLICATIONS

Chinese Office Action dated Mar. 23, 2017.

(Continued)

*Primary Examiner* — Ismael Negron
(74) *Attorney, Agent, or Firm* — Dilworth & Barrese, LLP; Michael J. Musella, Esq.

(57) ABSTRACT

A display backlight module includes a light guide plate, a light source disposed on a side of the light guide plate, and at least one of a flexible printed circuit board and a backplate, such that an end of the light guide plate closest to the light source is fixed on the flexible printed circuit board or the backplate by a plurality of double-sided adhesive blocks spaced apart from each other.

14 Claims, 3 Drawing Sheets

(56) References Cited

U.S. PATENT DOCUMENTS

| | | | | |
|---|---|---|---|---|
| 7,488,103 | B2* | 2/2009 | Watanabe | G02B 6/0031 |
| | | | | 362/607 |
| 7,887,209 | B2* | 2/2011 | Ishino | G02B 27/0172 |
| | | | | 313/500 |
| 8,310,620 | B2* | 11/2012 | Yabe | G02B 6/002 |
| | | | | 349/61 |
| 8,342,730 | B2* | 1/2013 | Tsubaki | G02B 6/0068 |
| | | | | 362/600 |
| 8,523,422 | B2* | 9/2013 | Yu | G02B 6/0091 |
| | | | | 362/633 |
| 9,513,429 | B2* | 12/2016 | Yeom | G02B 6/0091 |
| 9,513,430 | B2* | 12/2016 | Nambu | G02B 6/0068 |
| 9,655,234 | B2* | 5/2017 | Sugawara | H05K 1/0274 |
| 2004/0004827 | A1* | 1/2004 | Guest | G02B 6/0091 |
| | | | | 362/612 |
| 2009/0237592 | A1* | 9/2009 | Mizutani | G02B 6/0021 |
| | | | | 349/62 |
| 2016/0057872 | A1* | 2/2016 | Park | G02B 6/0083 |
| | | | | 362/611 |

FOREIGN PATENT DOCUMENTS

| | | | |
|---|---|---|---|
| CN | 102032514 A | | 4/2011 |
| CN | 102062360 A | | 5/2011 |
| CN | 102878482 A | | 1/2013 |
| CN | 202708998 U | | 1/2013 |
| CN | 203082580 U | | 7/2013 |
| CN | 203615176 U | | 5/2014 |
| CN | 203907348 U | | 10/2014 |
| CN | 104748020 A | | 7/2015 |
| JP | 2005259374 A | * | 9/2005 |
| TW | 577549 U | | 2/2004 |
| TW | M474929 U | | 3/2014 |

OTHER PUBLICATIONS

Search Report and Written Opinion dated Jan. 11, 2016 from State Intellectual Property Office of the P.R. China.
Chinese Office Action dated Sep. 30, 2016.

* cited by examiner

DISPLAY BACKLIGHT MODULE HAVING DOUBLE-SIDE ADHESIVE BLOCKS

FIELD OF THE ART

Embodiments of the invention relate to a backlight module, a display panel and a display device.

BACKGROUND

A backlight module is an important component of Liquid Crystal Display (LCD) devices. As liquid crystals do not emit light by themselves, a backlight module is mainly configured for providing an even and high-brightness illuminant for a liquid crystal panel. The fundamental principle of the backlight module is to convert a dot or linear illuminant to a surface illuminant with high-brightness and homogenous brilliance through an effective optical mechanism, such that the liquid crystal panel may display images normally. Backlight modules may also be used in digital photoframes, E-papers, mobile phones and other display devices requiring backlight, in addition to liquid crystal televisions and LCDs.

A schematic cross section view of a backlight module used in a LCD is illustrated in FIG. 1. The backlight module comprises: a backplate 1, a reflector 6 disposed on the backplate 1, a light guide plate (LGP) 3 disposed on the reflector 6, as well as optical films such as a prism sheet and a reflective polarizing film (not shown in FIG. 1) disposed on the LGP 3. A light source 11 is disposed on a side of the LGP 3. The light source 11 comprises a plurality of Light Emitting Diodes (LEDs), which are fixed to a flexible printed circuit board 8 (FPCB). Light emitted by the light source 11 enters the LGP 3 at a side of the LGP 3 immediately adjacent the light source. Light entering the LGP 3 exits from an upper side of the LGP 3 and enters the optical films to be converted into backlight with high-brightness and homogenous brilliance. To obtain higher light extraction efficiency for the LEDs, the LGP 3 has to contact the LEDs very closely. As illustrated in FIG. 2, according to conventional arts, two transparent double-sided adhesive tapes are mainly used to fix the LGP 3 to the backplate 1, where one double-sided adhesive tape (i.e., a double-sided adhesive tape 5) is attached to an end of the LGP 3 close to the LEDs, while another double-sided adhesive tape (a double-sided adhesive tape 4) is attached to another end of the LGP 3 away from the LGP3, with a length approximately equal to a width of the LGP 3.

It is found that the light source is often at higher temperature due to poor heat dissipation, long operation hours and so on. If the above light source works at a high temperature for a period of time (say for two hours at 50° C.), brightness of the liquid crystal panel will be decreased after the light source returns to its normal operation temperature. Such phenomenon is due to the following fact: when the light source functions at a high temperature, the LEDs are the main heat source. As a result, the end of the LGP 3 close to the LEDs is expanded quite severely, causing the LGP 3 to extend further away from the LEDs. The expanded and extended LGP 3 will be fixed once again at a new position by the two double-sided adhesive tapes. On the other hand, the double-sided adhesive tape 5 close to the LEDs ages easily by the high temperature, leading to a smaller fixing force than the double-sided adhesive tape 4 away from the LEDs. As a result, when the light source cools down, the LGP 3 will contract, with the double-sided adhesive tape 4 away from the LEDs as a fixed point, causing a gap between the cooled-down light source 11 and the LGP 3. The presence of the gap will affect the light extraction efficiency of the LEDs, which will further decrease the brightness of the display.

SUMMARY

The embodiments of invention provides a backlight module, a display panel and a display device, which can reduce the gap between the light source and the light guide plate caused by high-temperature operation of the backlight module, improve the light extraction efficiency of the light source and increase the brightness of the display device.

The following technical solutions are used to achieve the above objectives.

An aspect of the invention provides a backlight module, comprising: a light guide plate, a light source disposed on a side of the light guide plate, a flexible printed circuit board for fixing the light source, and a backplate, wherein an end of the light guide plate which is close to the light source is fixed on the flexible printed circuit board and/or the backplate through segmented double-sided adhesive tapes, and each of the segmented double-sided adhesive tapes comprises a plurality of double-sided adhesive blocks being spaced apart from each other.

The light source is strip-shaped. As an example, the segmented double-sided adhesive tapes extend along a length direction of the light source.

As an example, the end of the light guide plate which is close to the light source is fixed through the segmented double-sided adhesive tapes, while the end of the light guide plate away from the light source is not fixed with the double-sides adhesive tapes.

The light source comprises a plurality of groups of LEDs being spaced apart from each other along the length direction of the light source. As an example, each group of the LEDs corresponds to an area between two adjacent double-sided adhesive blocks on the segmented double-sided adhesive tape.

For example, the double-sided adhesive block comprises: a base material, a first adhesive layer disposed on a first surface of the base material and a second adhesive layer disposed on a second surface opposite to the first surface of the base material.

The first adhesive layer is in contact with the light guide plate. As an example, the first adhesive layer has a patterned structure.

Further, as an example, a surface of the first adhesive layer has a strip-shaped protrusion and an extension direction of the protrusion is perpendicular to the length direction of the light source.

Further, as an example, the base material, the first adhesive layer and the second adhesive layer are all transparent material layers.

A second aspect of the invention further provides a display panel which is provided with any one of the above backlight module.

A third aspect of the invention further provides a display device which is provided with the above display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

NUMERAL REFERENCES 1. backplate; 3. light guide plate; 4. double-sided adhesive tape; 5. double-sided adhesive tape; 6. reflective sheet; 8. flexible printed circuit board; 10. segmented double-sided adhesive tape; 11. light source; 100. backlight module; 101. double-sided adhesive block; 1011. base material; 1012. first adhesive layer; 1013. second adhesive layer.

DETAILED DESCRIPTION

In order to clearly illustrate the technical solution of the embodiments of the invention, the drawings of the embodiments will be briefly described in the following; it is obvious that the described drawings are only related to some embodiments of the invention and thus are not limitative of the invention. Based on the described embodiments herein, those skilled in the art can obtain other embodiment(s), without any inventive work, which should be within the scope of the invention.

Embodiment 1

Figure 1:
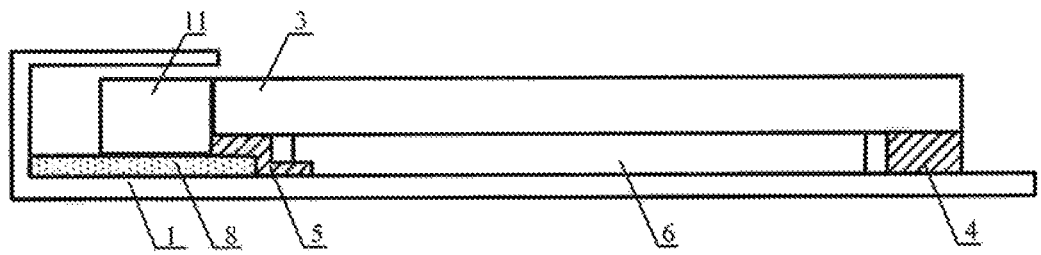
FIG. 1 schematically illustrates a cross section of a conventional backlight module.
Figure 2:
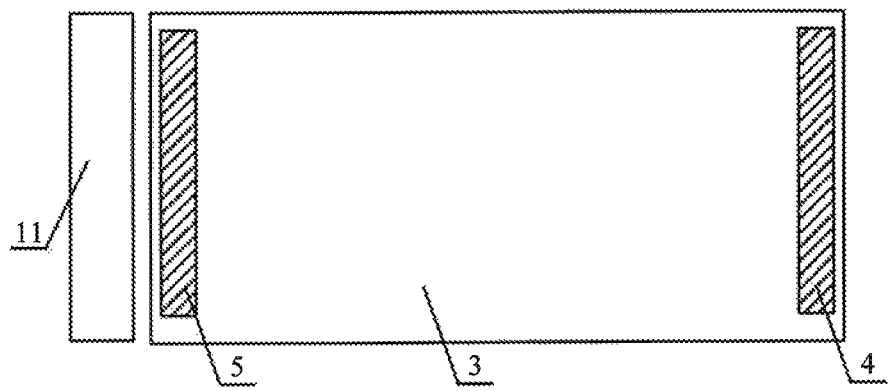
FIG. 2 schematically illustrates arrangement of double-sided adhesive tapes on a conventional LGP.
Figure 3:
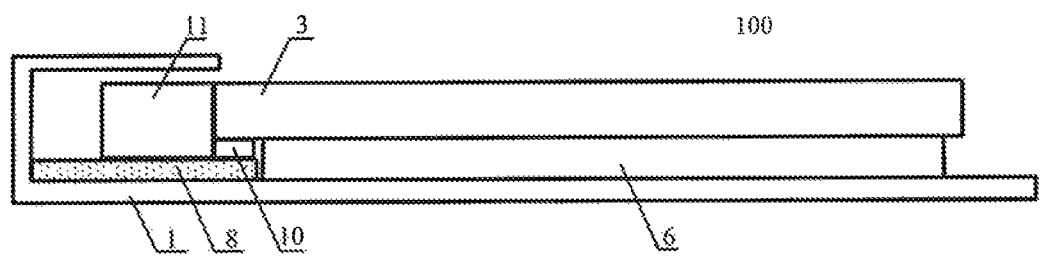
FIG. 3 schematically illustrates a cross section of a backlight module in accordance with an embodiment of the invention.
Figure 4:
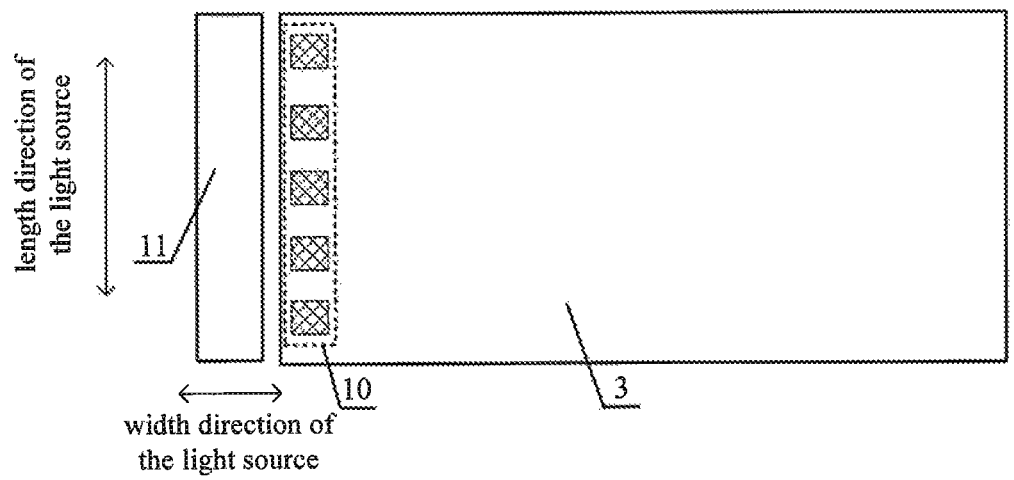
FIG. 4 schematically illustrates arrangement of double-sided adhesive tapes on a LGP in accordance with an embodiment of the invention.

The embodiment provides a backlight module 100 as illustrated in FIGS. 3 and 4, which comprises a light guide plate (LGP) 3, a light source 11 disposed on one side of the LGP 3 and a flexible printed circuit board 8 and/or a backplate 1; an end of the LGP 3 which is close to the light source is fixed on the flexible printed circuit board 8 and/or the backplate 1 through segmented double-sided adhesive tapes 10. As illustrated in FIG. 4, each of the segmented double-sided adhesive tapes 10 comprises a plurality of double-sided adhesive blocks 101 which are spaced apart from each other.

FIG. 3 illustrates that an end of the LGP 3 close to the light source 11 is fixed to the flexible printed circuit board 8 with double-sides adhesive tapes 10. Actually, the LGP 3 may also be directly fixed to the backplate 1 with double-sides adhesive tapes 10, where the LGP 3 is a plate structure. In case that the LGP 3 is seamlessly contacting the light source 11, there is most light entering the LGP 3, therefore the light source 11 has a largest light extraction efficiency (referring to a ratio between light entering the LGP 3 and total light emitted by the light source). The light source 11 may comprise various light emitting devices, such as LEDs, Electroluminescent (EL) sheets, Cold Cathode Fluorescent Lamps (CCFLs), Hot Cathode Fluorescent Lamp (HCFLs), Organic Light Emitting Diodes (OLEDs), and will not be defined in the embodiment. The flexible printed circuit board 8 is an optional component of the backlight module and may be replaced with other circuit structures, which will not be defined in the embodiment.

Fixing the LGP 3 though double-sides adhesive tapes 10 of the embodiment may be implemented in various ways. One possible embodiment is in the following way. Firstly, double-sides adhesive blocks 101 spaced apart from each other are fabricated on a release paper, thereby forming a double-sides adhesive tape 10. After that, one side of the double-sides adhesive tape 10 is attached to the end of the LGP 3 close to the light source, and the release paper is peeled off, thereby transferring the double-sides adhesive blocks 101 spaced apart from each other to the LGP 3. Finally, the LGP 3 having the double-sides adhesive tape 10 attached thereto is adhered to a supporter thereof (such as the backplate 1 or the flexible printed circuit board 8), thereby accomplishing the fixation. Generally, a release paper is also referred to as an anti-sticking paper, which may prevent itself from sticking to prepreg. An alternative embodiment is as follows. Firstly, double-sides adhesive blocks 101 spaced apart from each other are fabricated on a release paper, thereby forming a double-sides adhesive tape 10. After that, one side of the double-sides adhesive tape 10 is attached to the flexible printed circuit board 8 and/or the backplate 1, and the release paper is peeled off, thereby transferring the double-sides adhesive blocks 101 spaced apart from each other to the flexible printed circuit board 8 and/or the backplate 1. Finally, an end of the LGP 3 is adhered to the flexible printed circuit board 8 and/or the backplate 1, thereby accomplishing the fixation.

It is noted that: as shown in FIG. 3, in order to guarantee that the LGP 3 will be bonded and parallel to the reflective sheet 6 after being fixed and no end will be tilting, thicknesses of the segmented double-sided adhesive tapes 10 have to be designed appropriately during real implementation. Generally, the thicknesses of the segmented double-sided adhesive tapes 10 is preset to equal to or slightly larger than a difference between thickness of the reflective sheet 6 and thickness of the flexible printed circuit board 8.

According to the above technical solution, in the backlight module of the embodiment as illustrated in FIG. 4, as the LGP 3 is fixed at the end close to the light source 11 by the segmented double-sided adhesive tapes 10, when the LGP 3 expands due to an increased temperature, the end close to the light source 11 may expand along both a width direction and a length direction of the light source. In comparison with conventional arts which use regular double-sided adhesive tapes (that is, a strip of continuous double-sided adhesive tape) to fix the LGP 3, the expansion of the LGP 3 at the end close the light source 11 in the embodiment is increased along the length direction of the light source 11 while decreased along the width direction of the light source 11. As a result, when the LGP 3 cools and contracts, the gap between the LGP 3 and the light source is reduced. By this means, the problem of brightness being reduced by the backlight module operating under high temperature is significantly or completely overcome in a display device with the backlight module of the embodiment.

Moreover, liquid crystal panels are sometimes defective, so they need to be disassembled and reworked. In this case, components like LGPs are generally reused. By using the segmented double-sided adhesive tapes to fix the LGP according to the embodiment, when the LGP is separated from the segmented double-sided adhesive tapes, little or even no adhesive layers is left on the LGP, which then may be reused by simply cleansing thereby reducing the cost of the cleansing process for the LGP.

In the embodiment as shown in FIG. 4, the light source 11 of the backlight module is strip-shaped. As an example, the segmented double-sided adhesive tapes 10 extend along a length direction of the light source 11. In a detailed embodiment, the segmented double-sided adhesive tapes 10 are arranged as close as possible to an edge of the end of the LGP 3 which is close to the light source 11. As an example, an external edge of the segmented double-sided adhesive tapes 10 is aligned to the edge of the LGP 3. By arranging the segmented double-sided adhesive tapes 10 in this way, as illustrated in FIG. 3, only the peripheral space of the LGP 3 is occupied, allowing the reflective sheet 6 to have a relatively large space, thereby improving the light usage.

When fixing the LGP by using the segmented double-sided adhesive tapes, the LGP may be fixed at the end close to the light source by using one segmented double-sided adhesive tape and fixed simultaneously at the end away from the light source by using another double-sided adhesive tape (which may be a segmented double-sided adhesive tape or a regular segmented double-sided adhesive tape) to make the fixation more stable. To allow the end of the LGP close to the light source to have a larger expansion degree along the length direction of the light source so as to reduce the gap, the end of the LGP which is close to the light source is fixed through a segmented double-sided adhesive tape, while the end of the LGP away from the light source is fixed not with a double-sides adhesive tape, or is fixed with an engagement structure. It is proved by practice that such an approach is not only feasible, but also has the advantages of reducing the gap between the LGP and the light source caused by high-temperature operation of the backlight module and reducing the cost as less segmented double-sided adhesive tapes are used.

Figure 5:
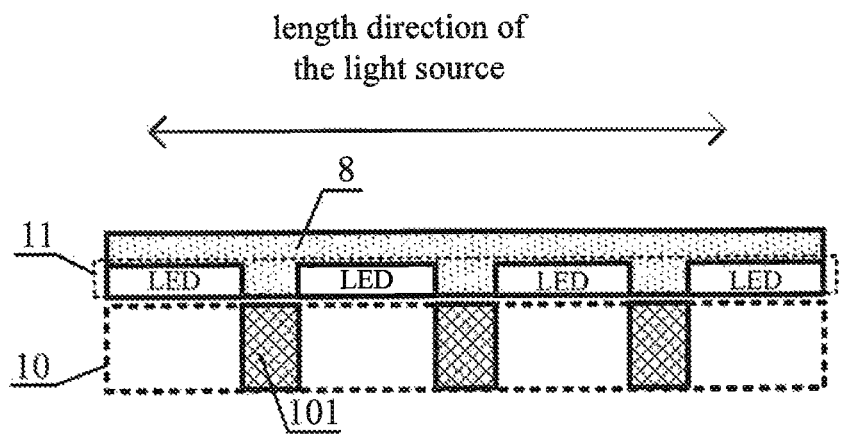
FIG. 5 schematically illustrates correspondence between double-sided adhesive blocks spaced apart from each other and LEDs forming a light source in accordance with an embodiment of the invention.

An LED is a typical dot light source, which is widely used due to its high brightness and low power consumption. As illustrated in FIG. 5, the light source 11 of the embodiment comprises a plurality of groups of LEDs which are spaced apart from each other along the length direction of the light source, and each group of the LEDs corresponds to an area between two adjacent double-sided adhesive blocks on the segmented double-sided adhesive tape. When fabricating the backlight module, in order to meet the brightness requirement of the liquid crystal panel, the number of groups of LEDs in the light source 11 and the number of LEDs in each group of LEDs may be adjusted. Generally, when the liquid crystal panel requires higher brightness, the number of groups of LEDs and the number of LEDs in each group of LEDs may be increased appropriately. As an example, when the light source 11 comprises a plurality of groups of LEDs spaced apart from each other, the LEDs correspond to the areas between the double-sided adhesive blocks 101. Such a design can further improve the light extraction efficiency of the light source, which is explained as follows.

Figure 6:
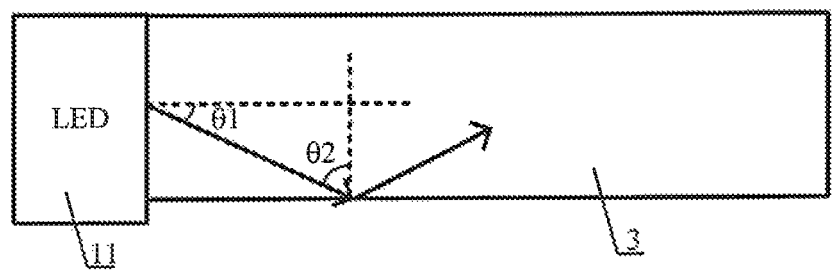
FIG. 6 schematically illustrates a light path when the LGP in accordance with an embodiment of the invention has not an adhesive layer there-below.

Generally, LGPs are made of Polymethyl Methacrylate (PMMA), which has a refraction index of 1.49, while the refraction index of air is 1.00. It is known by calculation that an angle of total internal reflection at an interface between the LGP and the air is 42°. When the LEDs correspond to the areas between the double-sided adhesive blocks 101, the end of LGP 3 directly facing the LEDs has air below. Ideally, as illustrated in FIG. 6, light emitted by the LEDs is all refracted and enters the LGP 3 (as there is a very thin layer of air between the LED and the LGP 3), with a refraction angle $\theta1<42°$, thus, $\theta2=90°-\theta1>48°$, $\theta2>42°$, which means that when light from the LEDs enters the LGP 3 and strikes the interface between the LGP 3 and the air, it is totally reflected back to the LGP 3 and propagated therein with almost no light loss.

Figure 7:
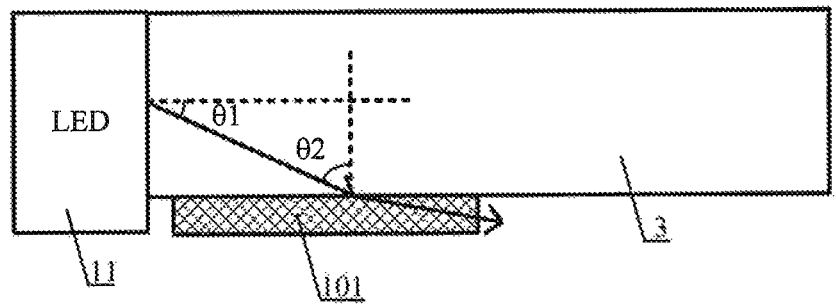
FIG. 7 schematically illustrates a light path when the LGP in accordance with an embodiment of the invention has an adhesive layer there-below.

As illustrated in FIG. 7, when the LEDs correspond to the double-sided adhesive blocks 101, the LEDs have double-sided adhesive blocks 101 below the end of LGP 3 directly facing the LGP 3. The LGP 3 is made of PMMA with a refraction index of 1.49, and a refraction index of the double-sided adhesive blocks 101 is 1.41. It is known by calculation that an angle of total internal reflection at an interface between the LGP and the double-sided adhesive blocks 101 is 70°. Among the light entering the LGP 3 from the LEDs via refraction, the light with a refraction angle of less than 70° will be transmitted through the double-sided adhesive blocks 101 when arriving at the interface between the LGP 3 and the double-sided adhesive blocks 101, which results in light loss.

Therefore, the light extraction efficiency of the light source 11 can be further increased when each group of the LEDs correspond to a space area between two adjacent double-sided adhesive blocks (that is, a void area between two adjacent double-sided adhesive blocks). Various methods may be used to allow each group of the LEDs to correspond to space areas between the double-sided adhesive blocks. For example, the following approach may be used. First, segmented double-sided adhesive tapes 10 are fabricated, during such procedure a distribution of the double-sided adhesive blocks is designed to match the distribution of the LEDs. Then the segmented double-sided adhesive tapes 10 are fixed to the LGP 3, during such procedure one side of the segmented double-sided adhesive tapes 10 is fixed to the flexible printed circuit board and/or the backplate, allowing the areas between the double-sided adhesive blocks 101 to be aligned with each group of the LEDs, and then attach the LGP 3 to the other side of the segmented double-sided adhesive tapes 10.

Figure 8:
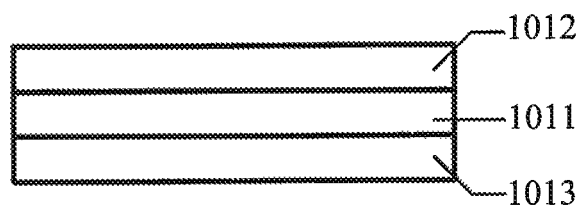
FIG. 8 schematically illustrates a cross section of segmented double-sided adhesive tapes in accordance with an embodiment of the invention.

As an example, FIG. 8 schematically illustrates a cross section structure of a double-sided adhesive block 101, which comprises: a base material 1011, a first adhesive layer 1012 disposed on a first surface of the base material 1011 and a second adhesive layer 1013 disposed on a second surface opposite to the first surface of the base material 1011. The base material 1011 is tightly adhered to the two adhesive layers and functions as a carrier for the two adhesive layers. The base material is typically of a plastic material with certain elasticity, thereby allowing the segmented double-sided adhesive tapes to be elastic to a certain extent. The double-sided adhesive tapes with a certain elasticity will generate a stress (with a direction opposite to the expansion direction) obstructing the LGP from expanding when the LGP expands under heat. The stress facilitates the LGP to return to the original position when the LGP cools and contracts, which can reduce the gap between the LGP and the light source caused by the expansion of the LGP under heat.

Figure 9:
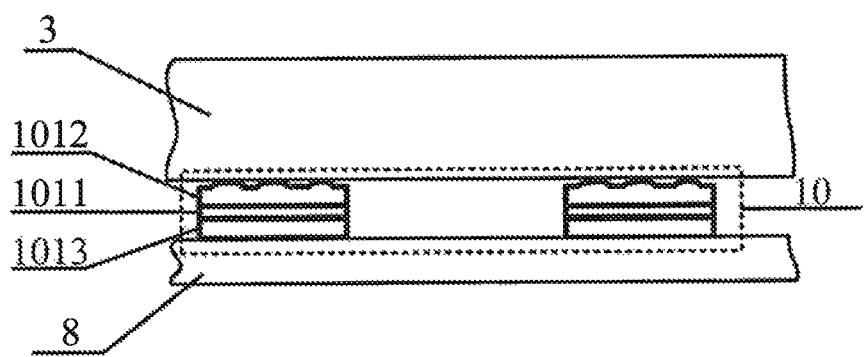
FIG. 9 schematically illustrates assembly of patterned segmented double-sided adhesive tapes with the LGP and FPCB.

To leave as little as possible, preferably no adhesive layer on the LGP when the segmented double-sided adhesive tapes is peeled from the LGP, for example, as illustrated in FIG. 9, the first adhesive layer 1012 which is in contact with the LGP has a patterned structure. Such a design can reduce the contact area between the first adhesive layer 1012 and the LGP 3, thereby reducing residual adhesive layer on the surface of the LGP. It is noted that the "patterned structure" is designed to reduce the contact area between the first adhesive layer 1012 and the LGP and no detailed embodiment thereof will be defined here. As an example, the pattern may be designed as a partially hollowed-out pattern or a rugged pattern. As for the second adhesive layer 1013 opposite to the first adhesive layer 1012, it is tightly attached to the flexible printed circuit board and/or the backplate, which has a relatively low requirement on the smoothness. In this sense, the second adhesive layer 1013 may be designed as being planar, though it may also have a patterned structure like the first adhesive layer 1012. However, for the purpose of firmly attaching the second adhesive layer 1013 to the flexible printed circuit board and/or the backplate, for example, the surface of the second adhesive layer 1013 is made to be smooth, thereby increasing the contact area there-between with the flexible printed circuit board or the backplate.

To prove that the first adhesive layer 1012 having a patterned surface can reduce the residual adhesive on the surface of the LGP, the stickinesses of a segmented double-sided adhesive tape A with a patterned surface and a segmented double-sided adhesive tape B with a planer surface are tested, respectively. It is found that the stickiness of tape A is smaller than that of tape B. It is known that the higher the stickiness of the adhesive layers is, the easier it is to leave residual adhesive layer on the surface of the LGP. Therefore, the first adhesive layer 1012 with a rugged surface can reduce the residual adhesive layer on the surface of the LGP.

By using double-sided adhesive layers 'segmented' along the length direction of the light source to fix the LGP, the LGP has a higher degree of freedom of expansion along the length direction of the light source. In view of such a notion, as illustrated in FIG. 9, for example, strip-shaped protrusions are formed on a surface of the first adhesive layer 1012 of the segmented double-sided adhesive layer 10. An extension direction of the protrusions is perpendicular to the length direction of the light source, that is, the arrangement direction of the strip-shaped protrusions is along the length direction of the light source, which is equivalent to "segment" the first adhesive layer 1012 in the adhesive area 101 once again along the length direction of the light source, thereby further increasing the degree of freedom of expansion of the LGP along the length direction of the light source. As a result, it further reduces the gap between the LGP 3 and the light source caused by high-temperature operation of the backlight module, thereby maintaining a high display brightness of the LCD. Moreover, when fixing the LGP 3 by using such segmented double-sided adhesive tape, the residual adhesive layer on the surface of the LGP 3 when separating the LGP 3 and the segmented double-sided adhesive tapes can be further reduced.

The segmented double-sided adhesive tapes 10 are transparent adhesive tapes, which means the base material, the first adhesive layer and the second adhesive layer of the segmented double-sided adhesive tapes 10 are all transparent material layers. As a result, a part of light emitted by the light source 11 penetrates the transparent segmented double-sided adhesive tapes 10 and enters the LGP 3, improving the light extraction efficiency of the light source 11.

In summary, when the backlight module of the invention operates under a high temperature for a period of time and then the temperature is decreased, there will be no gap or only a small gap formed between the LGP and the light source, allowing the light source to have a high light extraction efficiency and the LCD to have a high display brightness.

Embodiment 2

The embodiment provides a display panel, which has the backlight module of Embodiment 1 disposed therein. The embodiment further provides a display device with the above display panel. With the display device of the embodiment, the problem of the brightness being reduced caused by high-temperature operation of the backlight module is mitigated or eliminated altogether. The display device may be a liquid display panel, an E-paper, a mobile phone, a tablet PC, a television, a display, a notebook PC, a digital photoframe, a navigator and any other product or component having a display function.

A test on brightness comparison between a conventional display device using regular double-sided adhesive tape to fix the LGP and the display device using the segmented double-sided adhesive tape to fix the LGP is performed.

Display device A has a backlight module of Embodiment 1 which uses the segmented double-sided adhesive tape to fix the LGP. It has a display brightness of 6000 nit.

Display device B has a backlight module which uses two regular double-sided adhesive tapes (that is continuous transparent double-sided adhesive tapes) to fix the LGP. It has a display brightness of 5500 nit.

It is seen from the above test that the display device using the segmented double-sided adhesive tape to fix the LGP has higher display brightness.

The backlight module provided by the embodiment of the invention comprises a LGP and a light source disposed on one side of the LGP, wherein an end of the LGP which is close to the light source is fixed through segmented double-sided adhesive tapes. For the convenience of description, an edge direction of the end of the LGP which is close to the light source is defined as lateral direction, and a direction in the plane of the LGP and perpendicular to the lateral direction is defined as longitudinal direction. Because the segmented double-sided adhesive tapes comprise a plurality of double-sided adhesive blocks spaced apart from each other, when such segmented double-sided adhesive tapes are used to fix the LGP, in comparison with LGPs fixed by regular double-sided adhesive tapes (that is, a strip of continuous double-sided adhesive tape), the expansion of the LGP at the end close the light source is less restricted along the lateral direction. Therefore, when the temperature of the LGP increase, in comparison with LGPs fixed by regular double-sided adhesive tapes, the expansion of the LGP at the end close the light source along the lateral direction is increased, making the expansion along the longitudinal direction to decrease accordingly, thereby decreasing the gap between the LGP and the light source, allowing the light source to have a high light extraction efficiency, which in turn maintains the brightness of the display The embodiments of the invention are described in a progressive manner. Similar or identical elements of the embodiment may reference to each other, with the emphasis of each embodiment lies in describing its difference to other embodiments. Especially, a device embodiment is described relatively simply, considering of its similarity to method embodiments. For related part please refer to description of the method embodiments.

What is described above is related to the illustrative embodiments of the disclosure only and not limitative to the scope of the disclosure; the scopes of the disclosure are defined by the accompanying claims.

The present application claims priority from Chinese Application No. 201510205042.3 filed on Apr. 27, 2015, the disclosure of which is hereby incorporated by reference herein in its entirety.

What is claimed is:

1. A backlight module, comprising: a light guide plate, a light source disposed on a side of the light guide plate, at least one of a flexible printed circuit board and a backplate, wherein an end of the light guide plate which is close to the light source is fixed on the at least one of the flexible printed circuit board and the backplate through segmented double-sided adhesive tapes, and each of the segmented double-sided adhesive tapes comprises a plurality of double-sided adhesive blocks being spaced apart from each other, an orthogonal projection of the plurality of double-sided adhesive tapes on a plane of the light source overlaps with the light source;

each of the double-sided adhesive blocks comprises a first adhesive layer, a surface of the first adhesive layer has a strip-shaped protrusion and an extension direction of the protrusion is perpendicular to a length direction of the light source.

2. The backlight module of claim 1, wherein an end of the light guide plate which is away from the light source is not fixed with double-sides adhesive tapes.

3. The backlight module of claim 1, wherein the light source is strip-shaped, and the segmented double-sided adhesive tapes extend along a length direction of the light source.

4. The backlight module of claim 3, wherein the light source comprises a plurality of groups of light emitting diodes (LEDs) being spaced apart from each other along the length direction of the light source, and each group of the LEDs corresponds to an area between two adjacent double-sided adhesive blocks on the segmented double-sided adhesive tape.

5. The backlight module of claim 1, wherein the double-sided adhesive block further comprises: a base material, and the first adhesive layer is disposed on a first surface of the base material; and a second adhesive layer disposed on a second surface opposite to the first surface of the base material.

6. The backlight module of claim 5, wherein the first adhesive layer is in contact with the light guide plate and has a patterned structure.

7. The backlight module of claim 5, wherein the base material, the first adhesive layer and the second adhesive layer are all transparent material layers.

8. A display panel device, comprising: a display panel, a light guide plate, a light source disposed on a side of the light guide plate, at least one of a flexible printed circuit board and a backplate, wherein an end of the light guide plate which is close to the light source is fixed on the at least one of the flexible printed circuit board and the backplate through segmented double-sided adhesive tapes, and each of the segmented double-sided adhesive tapes comprises a plurality of double-sided adhesive blocks being spaced apart from each other, an orthogonal projection of the plurality of double-sided adhesive tapes on a plane of the light source overlaps with the light source;

each of the double-sided adhesive blocks comprises a first adhesive layer, a surface of the first adhesive layer has a strip-shaped protrusion and an extension direction of the protrusion is perpendicular to a length direction of the light source.

9. The display panel of claim 8, wherein an end of the light guide plate which is away from the light source is not fixed with double-sides adhesive tapes.

10. The display panel of claim 8, wherein the light source is strip-shaped, and the segmented double-sided adhesive tapes extend along a length direction of the light source.

11. The display panel of claim 10, wherein the light source comprises a plurality of groups of light emitting diodes (LEDs) being spaced apart from each other along the length direction of the light source, and each group of the LEDs corresponds to an area between two adjacent double-sided adhesive blocks on the segmented double-sided adhesive tape.

12. The display panel of claim 8, wherein the double-sided adhesive block comprises: a base material, and the first adhesive layer is disposed on a first surface of the base material; and a second adhesive layer disposed on a second surface opposite to the first surface of the base material.

13. The display panel of claim 12, wherein the first adhesive layer is in contact with the light guide plate and has a patterned structure.

14. The display panel of claim 12, wherein the base material, the first adhesive layer and the second adhesive layer are all transparent material layers.

\* \* \* \* \*